United States Patent
Assmann et al.

(10) Patent No.: US 10,315,685 B2
(45) Date of Patent: Jun. 11, 2019

(54) STEERING SYSTEM FOR A MOTOR VEHICLE

(71) Applicant: FORD GLOBAL TECHNOLOGIES, LLC, Dearborn, MI (US)

(72) Inventors: Birger Assmann, Burscheid (DE); Andre Lewe, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 288 days.

(21) Appl. No.: 14/455,153

(22) Filed: Aug. 8, 2014

(65) Prior Publication Data
US 2015/0040715 A1 Feb. 12, 2015

(30) Foreign Application Priority Data

Aug. 9, 2013 (DE) .................. 10 2013 215 744

(51) Int. Cl.
  *B62D 3/12* (2006.01)
  *B62D 1/20* (2006.01)
  *F16D 1/08* (2006.01)
  *F16D 3/38* (2006.01)
  *F16D 1/10* (2006.01)

(52) U.S. Cl.
  CPC .................. *B62D 3/12* (2013.01); *B62D 1/20* (2013.01); *F16D 1/0864* (2013.01); *F16D 3/387* (2013.01); *F16D 2001/103* (2013.01)

(58) Field of Classification Search
  CPC .... B62D 1/16; B62D 1/20; B62D 3/12; F16D 3/387; F16D 1/02
  See application file for complete search history.

(56) References Cited

U.S. PATENT DOCUMENTS 3,285,638 A * 11/1966 Folkerts ................... B62D 1/16
                                                    403/344
3,867,050 A *  2/1975 Pitner .................... F16B 2/065
                                                    403/373

(Continued)

FOREIGN PATENT DOCUMENTS

DE  11 2008 001 042 T5   5/2010
DE  10 2011 050 748 B3   7/2012

(Continued)

*Primary Examiner* — Barry Gooden, Jr.
(74) *Attorney, Agent, or Firm* — Jones Robb, PLLC; Raymond Coppiellie (57) ABSTRACT

A steering system for a motor vehicle is provided. The system comprises an articulated bearing and a shaft configured to be fixed to the articulated bearing. The articulated bearing comprises a clevis a mating clevis pivotally connected to the clevis. The clevis has a foot arranged substantially transversely to a longitudinal axis of the clevis, and two arms connected to the foot and substantially extending opposite one another along the longitudinal axis. The foot includes a longitudinal opening having a cross-sectional contour for receiving the shaft. At least one end of the shaft has an external contour complementary to the cross-sectional contour, wherein the cross-sectional contour of the longitudinal opening and the external contour of the shaft are formed to permit the shaft to be received in the longitudinal opening in one single rotational position about the longitudinal axis.

13 Claims, 7 Drawing Sheets

(56) References Cited

U.S. PATENT DOCUMENTS

| | | | | |
|---|---|---|---|---|
| 5,253,949 | A * | 10/1993 | Oxley | B62D 1/16 403/155 |
| 5,575,581 | A * | 11/1996 | DeBisschop | B62D 1/16 403/157 |
| 8,235,420 | B2 * | 8/2012 | Moriyama | B62D 1/20 280/777 |
| 2005/0140130 | A1 * | 6/2005 | Laisement | B62D 1/20 280/775 |
| 2008/0118326 | A1 * | 5/2008 | Inoue | B21K 1/12 411/155 |
| 2014/0356062 | A1 * | 12/2014 | Janvier | F16D 1/076 403/374.3 |

FOREIGN PATENT DOCUMENTS

| | | |
|---|---|---|
| DE | 10 2011 050 747 B3 | 8/2012 |
| JP | 2008-208923 A | 9/2008 |
| WO | WO 2013/030478 A1 | 3/2013 |

\* cited by examiner

STEERING SYSTEM FOR A MOTOR VEHICLE

CROSS REFERENCE TO RELATED APPLICATIONS

This application claims priority to German Application No. 102013215744.4, filed on Aug. 9, 2013, the entire contents of which is incorporated by reference herein.

TECHNICAL FIELD

The present disclosure relates generally to a steering system for motor vehicles, and more particularly to steering systems using column EPAS.

BACKGROUND

Steering systems of motor vehicles often comprise articulated bearings, which are formed from two clevises. In assembling the motor vehicle, coupling the articulated bearing, particularly to a steering pinion of the steering system, can prove difficult, since these components may be located at poorly accessible or poorly visible points in the motor vehicle (for example, in the foot well area close to the pedals).

Current assembly methods and designs permit ease of assembly but also allow for potential permanent misalignment between the yoke and the pinion (due to required assembly tolerances) that may impair torque transmission in a Column EPAS. It is desirable to find a solution that provides ease of fit during assembly of the steering system elements without sacrificing torque transmission.

SUMMARY

In accordance with various exemplary embodiments, the present disclosure provides a steering system for a motor vehicle. The steering system comprises an articulated bearing comprising a clevis and a mating clevis pivotally connected to the clevis, and a shaft configured to be fixed to the articulated bearing. The clevis includes a foot arranged substantially transversely to a longitudinal axis of the clevis, and two arms connected to the foot and substantially extending opposite one another along the longitudinal axis. The foot includes a longitudinal opening having a cross-sectional contour for receiving the shaft. At least one end of the shaft has an external contour complementary to the cross-sectional contour, and the cross-sectional contour of the longitudinal opening and the external contour of the shaft are formed to permit the shaft to be received in the longitudinal opening in one single rotational position about the longitudinal axis.

In accordance with another aspect of the present disclosure, a motor vehicle is provided. The motor vehicle comprises a steering system comprising an articulated bearing having a clevis and a mating clevis pivotally connected to the clevis, and a shaft configured to be fixed to the articulated bearing. The clevis includes a foot arranged substantially transversely to a longitudinal axis of the clevis, and two arms connected to the foot and substantially extending opposite one another along the longitudinal axis. The foot includes a longitudinal opening having a cross-sectional contour for receiving the shaft. At least one end of the shaft has an external contour complementary to the cross-sectional contour, and the cross-sectional contour of the longitudinal opening and the external contour of the shaft are formed to permit the shaft to be received in the longitudinal opening in one single rotational position about the longitudinal axis.

In accordance with another aspect of the present disclosure, a steering system for a motor vehicle comprises a clevis and a shaft configured to be fixed to the clevis. The clevis includes two arm portions extending in parallel. The two arm portions are connected to one another by a foot portion. The foot portion has an opening configured to receive the shaft and a gap in an outer wall of the foot portion, the gap extending from the opening to the outer wall. The opening includes a first contour and an outer surface of a portion of the shaft includes a second contour. The first contour and the second contour are complementary to one another. The second contour of the shaft can be received by the longitudinal opening in only one orientation.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure. It should be noted that the features set out individually in the following description can be combined with each other in any technically advantageous manner and set out other embodiments of the present disclosure.

The present disclosure provides an interface which combines the ease of assembly and the ability to transmit high torques. The torque transmission may be done via a spline interface on half of the yoke, combined with v-shaped flat surfaces. Such a configuration permits only one possible positioning for engagement at the interface. That is, it is not possible to engage the splines in an incorrect orientation, which would lead to a blockage of the assembly process and require a disassembly and a re-orientation.

The present disclosure relates to a steering system for a motor vehicle that comprises an articulated bearing and a shaft, which is or which can be fixed to the articulated bearing. The articulated bearing comprises a clevis and a mating clevis pivotally connected to the clevis. The clevis comprises a foot, substantially arranged transversely to a longitudinal axis, and two opposing arms connected to and extending from the foot substantially in the direction of the longitudinal axis. The foot comprises a longitudinal opening through which the shaft passes such that a longitudinal axis of the shaft is aligned with the longitudinal axis of the clevis. The longitudinal opening is defined by a wall, the wall having a surface contour, also referred to herein as a cross-sectional contour, that defines the shape of the opening and is configured to receive the shaft. The shaft has an external surface that is contoured or shaped (e.g., an external contour) to correspond to, or to complement, the cross sectional contour of the longitudinal opening. That is, the surface that defines the longitudinal opening and the external surface of the shaft that is to be received in the opening are shaped to be complementary to one another such that the surfaces fit or mesh with each other.

According to the present disclosure, the cross-sectional contour of the longitudinal opening and the external contour of the shaft are correspondingly formed in such a way as to receive the shaft in the longitudinal opening in one single rotational position about the longitudinal axis. In one exemplary embodiment, the articulated bearing is a universal joint, and the clevis is connected to the mating clevis by means of a cardan spider and the shaft is a steering pinion, which meshes with a steering gear.

A steering system which is easy to assemble is thereby advantageously provided. The clevis can easily be connected to a shaft. The shaft can be introduced into the longitudinal opening of the clevis only in one single orientation. Any assembly error, which might entail rectification work, can be prevented.

Since the shaft can be introduced into the clevis in only one single orientation, it is not necessary for a person doing the assembly to be able to see the assembly space. This makes the clevis of the steering system particularly suitable for assembly at poorly visible locations, such as, for example, the foot well of a motor vehicle.

In one exemplary embodiment of the steering system according to the present disclosure, the cross-sectional contour of the clevis has at least one internal bias and the external contour of the shaft has at least one external bias.

This is an easy way of creating a cross-sectional contour of the longitudinal opening and an external contour of the shaft which allow only one orientation of the shaft when introducing it into the clevis. Moreover, the shaft can thereby be connected to the clevis by a positive interlocking connection in the circumferential direction of the shaft.

In another exemplary embodiment of the steering system according to the present disclosure, at least some areas of the cross-sectional contour of the clevis comprise internal toothing, and at least some areas of the external contour of the shaft comprise external toothing.

A greater torque can thereby be transmitted between the clevis and the shaft.

In another exemplary embodiment of the steering system according to the present disclosure, the clevis has a clamping gap.

The clamping gap facilitates widening and narrowing the longitudinal opening and, thus, makes it easier to fit the clevis onto the shaft. The shaft can be inserted into the longitudinal opening of the clevis more easily. The clevis can be clamped tight by simple clamping means, such as, for example, a bolt and a nut.

In another exemplary embodiment of the steering system according to the present teachings, at least one internal bias of the clevis is located on the side of the clamping gap.

The at least one internal bias can be applied to the shaft when the longitudinal opening is narrowed. The shaft, with its external toothing, is simultaneously pressed into the internal toothing located opposite. This affords the shaft a more secure grip, free of play.

In another exemplary embodiment of the steering system according to the present disclosure, the shaft may have a bolt recess. This represents an easy way of producing a positive interlocking connection between the shaft and the clevis by corresponding means in a longitudinal direction.

Each of the disclosed embodiments of the steering system according to the present teachings may be incorporated into a motor vehicle. A motor vehicle containing a steering system in accordance with the present teachings thus benefits from the ease of assembly and advantages of the steering system already described.

Figure 1:
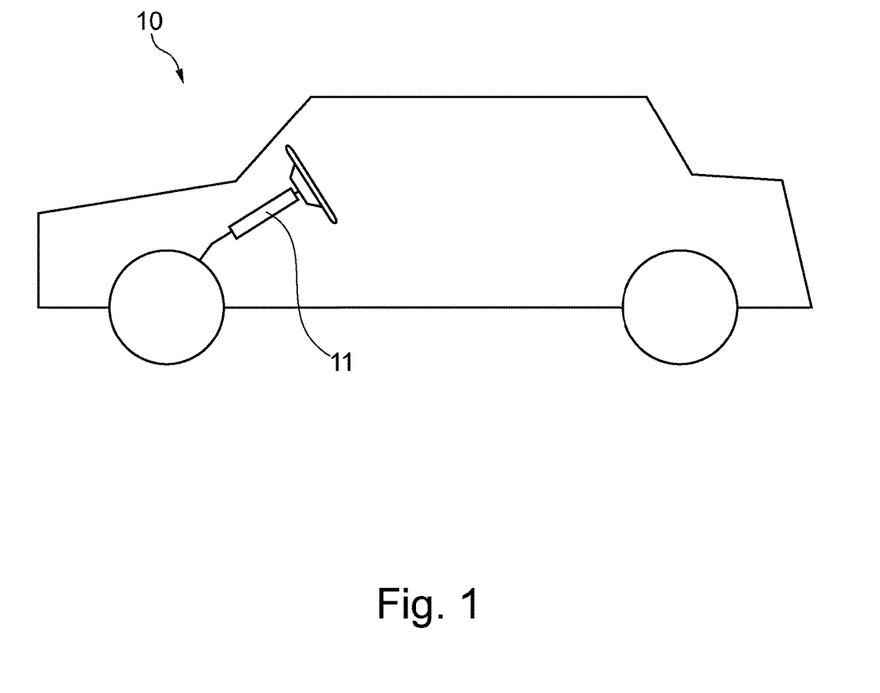
FIG. 1 is representation of a motor vehicle employing a steering system in accordance with the present teachings.

Turning now to the drawings, FIG. 1 shows an example of a motor vehicle 10, which incorporates at least one steering system 11 in accordance with the present teachings. The steering system 11 allows a driver of the vehicle to steer the motor vehicle 10.

Figure 2:
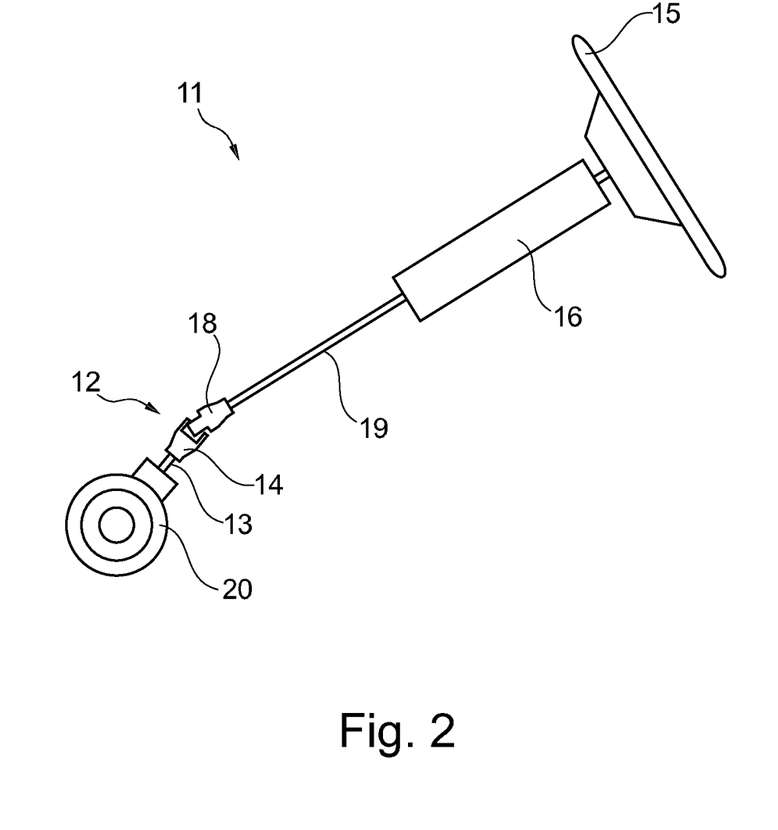
FIG. 2 is a schematic representation of a steering system in accordance with the present disclosure.

An exemplary embodiment of the steering system 11 is shown in FIG. 2. According to the present disclosure, the steering system 11 comprises an articulated bearing 12 and a shaft 13 fixed to the articulated bearing 12. Articulated bearing 12 comprises a clevis 14 and a mating clevis 18 pivotally connected to the clevis 14. The articulated bearing 12 may be designed, for example, as a universal joint. In such a case, the clevis 14 is connected to the mating clevis 18 by way of, for example, a cardan spider.

In the exemplary embodiment shown in FIG. 2, the steering system 11 comprises a steering wheel 15 and a steering column 16. The shaft 13 is a steering pinion 13. A connection shaft 19, which is fixed to the mating clevis 18 of the articulated bearing 12, is a steering spindle 19. According to the present disclosure, it is also feasible for the shaft 13 to be the steering spindle. Moreover, according to the present teachings, it is possible for the steering system 11 to comprise multiple articulated bearings 12. The steering pinion 13 leads into a steering gear 20. The steering gear 20 can be connected to the front wheels of the motor vehicle 10.

Figure 3:
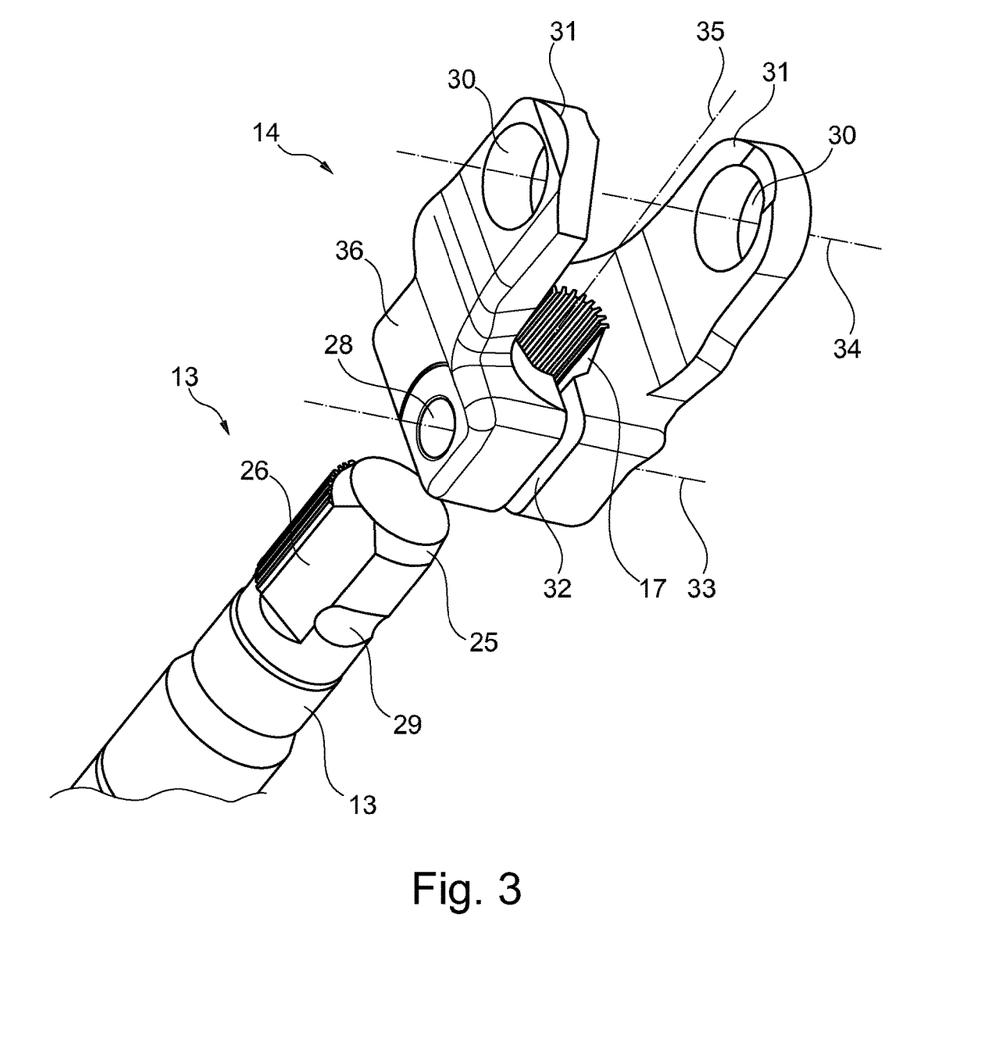
FIG. 3 is a perspective view of a clevis and a shaft of an exemplary embodiment of a steering system according to the present disclosure.
Figure 4:
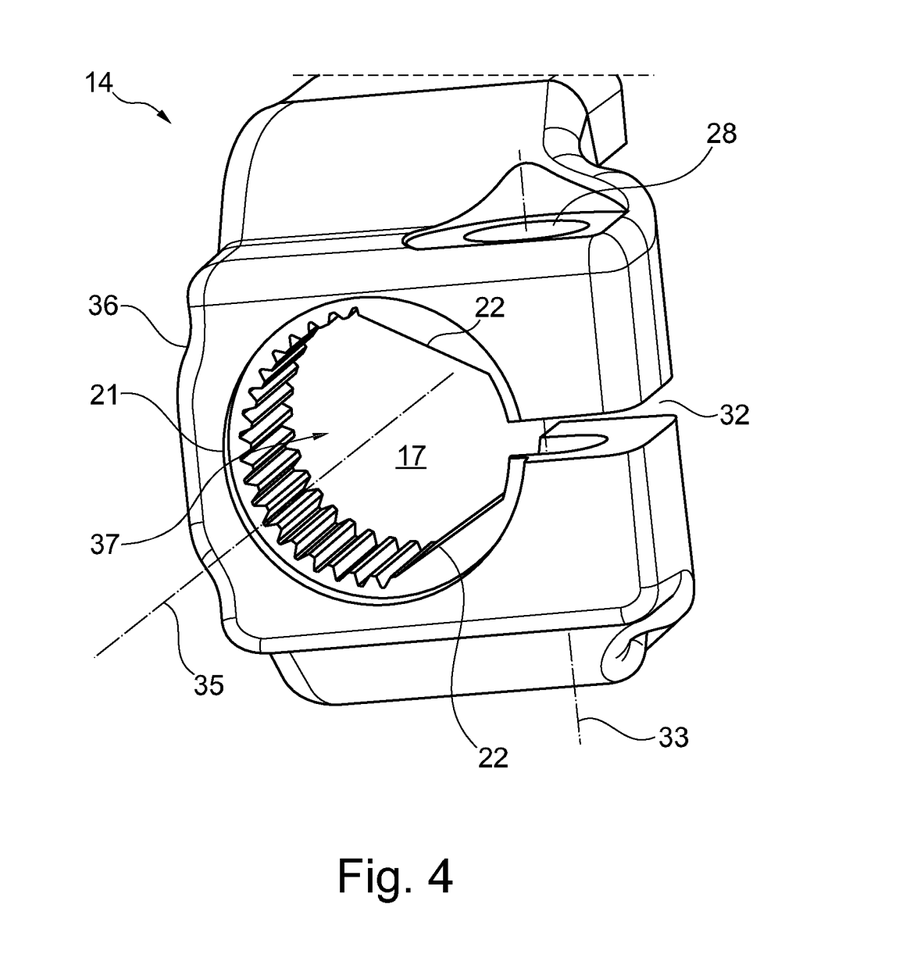
FIG. 4 is a front perspective view of the clevis of FIG. 4.
Figure 6:
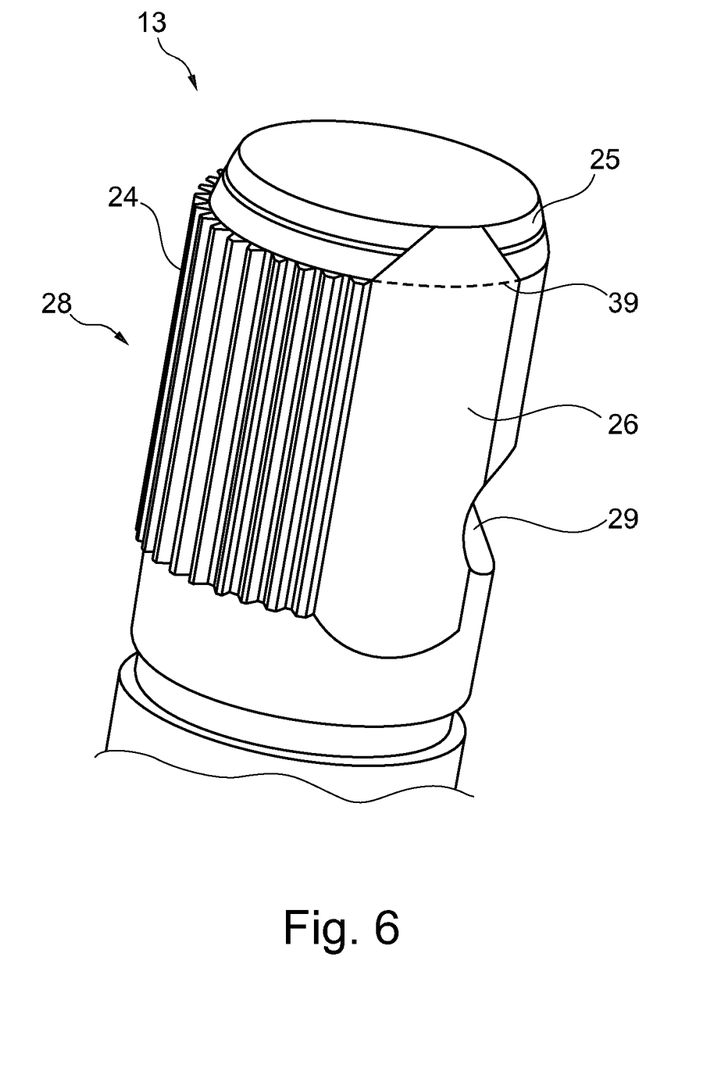
FIG. 6 is a perspective view of an end of the shaft of FIG. 3.

In FIG. 3, the clevis 14 and the shaft 13 are shown disassembled. FIG. 4 shows the clevis 14 detached in a further perspective view and FIG. 6 shows the shaft 13 detached in a further perspective view.

As shown in FIGS. 3 and 4, the clevis 14 of the steering system 11 comprises a foot 36 and two arms 31. The arms 31 are connected to the foot 36. In the exemplary embodiment shown, the arms 31 and the foot are connected together by a cohesive material joint. In particular, the clevis 14 is integrally formed. Here the foot 36 is arranged substantially transversely to a longitudinal axis 35 and the arms 31 are arranged substantially longitudinally in relation to the longitudinal axis 35. The arms 31 are arranged opposite one another.

In accordance with the present disclosure, foot 36 comprises a longitudinal opening 17 through which longitudinal axis 35 passes. A length of longitudinal opening 17 extends along the longitudinal axis 35. The longitudinal opening 17 has a cross-sectional contour 37. According to the present disclosure the longitudinal opening 17 is designed to receive the shaft 13 in one single rotational position about the longitudinal axis 35. The rotational position relates to the orientation of the shaft 13 on the longitudinal axis 35 as an axis of rotation. The shaft 13 can be pushed into the longitudinal opening 17 only in one single orientation.

In particular, the arms 31 of the clevis 14 each have a pivot hole 30. The pivot holes 30 of the two arms 31 are preferably situated on a transverse axis 34. The pivot holes 30 serve to receive a pivot, for example via a cardan spider (not shown), by means of which the clevis 14 is joined to the mating clevis 18 to form the articulated bearing 12. The cardan spider is rotatably supported in the clevis 14 and rotatably supported in the mating clevis 18 perpendicularly thereto. As an alternative to the pivot holes 30 depicted as through-holes in FIG. 3, other methods of mounting for coupling to the mating clevis 18 are also feasible, for example, blind holes or other design forms may be used.

Clevis 14 may have a clamping gap 32 formed in foot 36, clamping gap 32 running substantially parallel to the longitudinal axis 35. The clamping gap 32 forms an opening in the cross-sectional contour 37. The clamping gap 32 serves to widen or narrow the longitudinal opening 17. Foot 36 of the clevis 14 may have clamping hole 28 along a clamping axis 33 and transverse to gap 32. In concert with the clamping gap 32, a narrowing of the longitudinal opening 17 can be brought about by suitable clamping means, for example by a bolt and a nut. This narrowing can serve to fix clevis 14 to the shaft 13, and along the longitudinal axis 35 a frictional connection can be produced between the clevis 14 and the shaft 13. In addition, through the arrangement of the clamping hole 28 extending transversely through at least one area of the longitudinal opening 17, a positive interlocking connection can be produced between the clevis 14 and the shaft 13 in a longitudinal direction by the clamping means, such that the clevis 14 will not move axially with respect to the shaft 13. For this purpose the shaft 13 may have a corresponding bolt recess 29.

Figure 5:
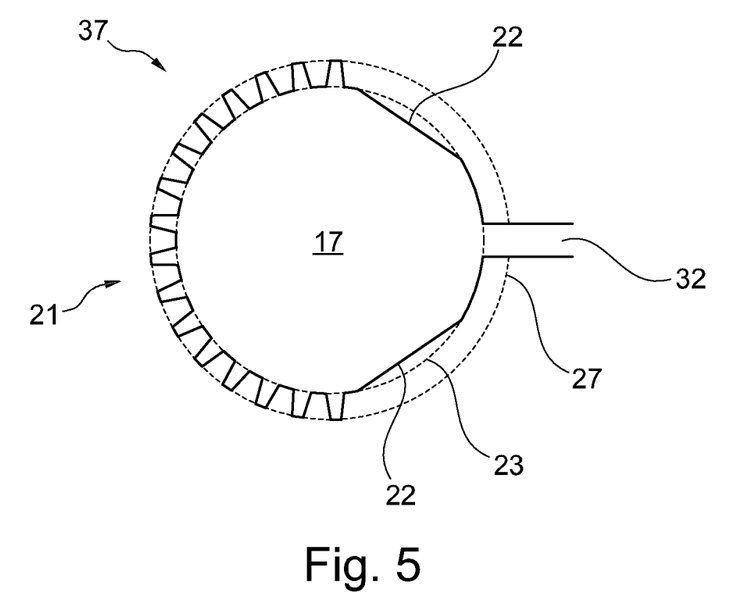
FIG. 5 is a partial cross section of the clevis of FIG. 4, illustrating the cross-sectional contour of the opening in the clevis.

The cross-sectional contour 37 of the longitudinal opening 17 is shown in more detail in FIG. 5. In the exemplary embodiment shown, the cross-sectional contour 37 runs along two opening circles, an inner opening circle 23 and an outer opening circle 27. The cross-sectional contour 37 preferably comprises at least one internal bias 22, which geometrically represents a secant of the inner opening circle 23. In the exemplary embodiment shown, the cross-sectional contour 37 comprises two opposed internal biases 22. The two internal biases 22 form a V-shape as shown in FIG. 5.

An internal bias 22 extends over approximately one quarter of the circumference of the inner opening circle 23. The at least one internal bias 22 may be situated on the side of the clamping gap 32 of the cross sectional contour 37. As used herein, the "side of the clamping gap 32" means the half of the inner opening circle 23 which borders on the clamping gap 32.

The cross-sectional contour 37 shown has an internal toothing 21. The internal toothing 21 extends over approximately half of the circumference of the opening circles 23, 27. The internal toothing may extend over less than half of the opening circles 23, 27, or may extend over more than half of the circumference of the opening circles 23, 27. The amount of internal toothing may be selected based on the amount of torque to be transmitted by the connection, but can be balanced against the space used for the internal/external biases that form the v-shape. In one exemplary embodiment, the internal toothing 21 is arranged on the side of the inner opening circle 23 or of the outer opening circle 27 remote from the clamping gap 32. A tooth of the internal toothing 21 extends from the inner opening circle 23 to the outer opening circle 27.

As disclosed herein, the shaft 13 comprises an external contour 38, which is formed to correspond to (i.e., complement) the cross-sectional contour 37 of the longitudinal opening 17 of the clevis 14. The external contour 38 of the shaft 13 is formed so as to introduce the shaft 13 into the longitudinal opening 17 of the clevis 14 in one single rotational position.

Figure 7:
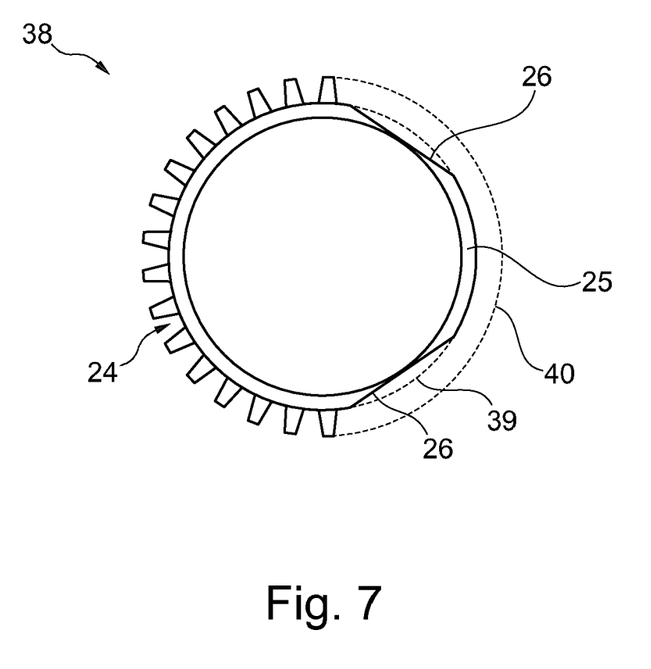
FIG. 7 is an end view of the shaft of FIG. 6 showing the external contour of the shaft.

The external contour 38 of the shaft 13 is shown in more detail in the exemplary embodiment of FIG. 7. In the exemplary embodiment shown, the external contour 38 runs along two shaft circles, an inner shaft circle 39 and an outer shaft circle 40. Corresponding to the cross-sectional contour 37 of the longitudinal opening 17, the external contour 38 comprises at least one external bias 26, which geometrically represents a secant of the inner shaft circle 39. In the exemplary embodiment shown, the external contour 38 comprises two opposing external biases 26. An external bias 26 extends over approximately one quarter of the circumference of the inner shaft circle 39.

The external contour 38 shown comprises an external toothing 24. The external toothing 24 extends over approximately half of the circumference of the shaft circles 39, 40. As with the internal toothing, the amount of external toothing may extend over less than half of the shaft circles 39, 40, or may extend over more than half of the circumference of the shaft circles 39, 40 and is selected to correspond to/complement the amount of internal toothing. A tooth of the external toothing 24 here extends from the inner shaft circle 39 to the outer shaft circle 40.

The diameter of the inner shaft circle 39 is larger than the diameter of the inner opening circle 23. For improved introduction of the shaft 13 into the longitudinal opening 17, the shaft 13 has a taper 25 at its end. At its end the shaft 13 thereby has a diameter which is smaller than the inner opening diameter 23. The taper facilitates insertion of the clevis onto the pinion. If the elements are not in the correct orientation to exactly match the teeth and the biases of both parts, the small end of the taper will start to engage onto the pinion (because it is smaller than the diameter given by the contact points of the teeth and the two biases) but will stop on a certain diameter of taper (given at a certain height of the taper) without engaging already the teeth and with that stopping the required rotation around the longitudinal axis 35. In this condition the clevis can freely rotated around longitudinal axis 35 until the exact matching position has been reached and the clevis "falls" onto the pinion.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a spring" includes two or more different springs. As used herein, the term "include" and its grammatical variants are intended to be non-limiting, such that recitation of items in a list is not to the exclusion of other like items that can be substituted or added to the listed items.

Further modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A steering system for a motor vehicle, comprising:
   an articulated bearing comprising a clevis and a mating clevis pivotally connected to the clevis; and
   a shaft configured to be fixed to the articulated bearing,
   wherein the clevis includes a foot arranged substantially transversely to a longitudinal axis of the clevis, and two arms connected to the foot and substantially extending opposite one another along the longitudinal axis, and wherein the foot includes a longitudinal opening having a cross-sectional contour for receiving the shaft, and
   wherein at least one end of the shaft has an external contour complementary to the cross-sectional contour, wherein the cross-sectional contour of the longitudinal opening and the external contour of the shaft are formed to permit the shaft to be received in the longitudinal opening in one single rotational position about the longitudinal axis, and wherein the external contour of the shaft includes at least one external bias comprising a substantially planar recess formed along a secant line of the shaft and extending over a chord of the shaft and the cross-sectional contour of the longitudinal opening includes at least one internal bias comprising a complementary substantially planar protrusion formed along a secant line of the longitudinal opening of the clevis and extending over a chord of the longitudinal opening of the clevis, and wherein the at least one end of the shaft comprises a tapered portion, wherein the substantially planar recess intersects the tapered portion.

2. The steering system as claimed in claim 1, wherein at least some areas of the cross-sectional contour of the clevis comprise internal toothing and wherein at least some areas of the external contour of the shaft comprise external toothing.

3. The steering system as claimed in claim 1, wherein the articulated bearing is a universal joint and the clevis is connected to the mating clevis by a cardan spider.

4. The steering system as claimed in claim 1, wherein the shaft has a bolt recess.

5. The steering system as claimed in claim 1, wherein the shaft is a steering pinion, which meshes with a steering gear.

6. The steering system as claimed in claim 1, wherein the clevis has a clamping gap.

7. The steering system as claimed in claim 6, wherein the at least one internal bias of the clevis is located on the side of the clamping gap.

8. A steering system for a motor vehicle, comprising:
   a clevis and a shaft configured to be fixed to the clevis,
   wherein the clevis includes two arm portions extending in parallel, the two arm portions connected to one another by a foot portion, wherein the foot portion has an opening configured to receive the shaft,
   wherein the foot portion includes a gap in an outer wall of the foot portion, the gap extending from the opening to the outer wall, and
   wherein the opening includes a first contour and an outer surface of a portion of the shaft includes a second contour, wherein the first contour and the second contour are complementary to one another, wherein the second contour of the shaft can be received by the longitudinal opening in only one orientation, wherein each of the first contour and second contour comprise a toothed portion extending around a first portion of a perimeter of the opening and the shaft, respectively, wherein the first contour comprises two substantially planar protrusions forming a V-shape and extending around a second portion of the perimeter of the opening and the second contour comprises two substantially planar recesses forming a V-shape and extending around a second portion of the perimeter of the shaft, and wherein the at least one toothed portion of the second contour extends radially beyond the two substantially planar recesses of the second contour.

9. The steering system as claimed in claim 8, wherein each of the first and second contours includes a plurality of toothed portions.

10. The steering system as claimed in claim 8, wherein the gap permits adjustment of a size of the opening in the foot portion.

11. The steering system as claimed in claim 8, wherein the clevis forms part of an articulated bearing and the clevis is connected to a mating clevis by a cardan spider.

12. The steering system as claimed in claim 11, wherein the articulated bearing is a universal joint.

13. The steering system as claimed in claim 11, wherein the shaft is a steering pinion, which meshes with a steering gear.

\* \* \* \* \*